(No Model.)
W. DECKER.
ARMATURE FOR DYNAMO ELECTRIC MACHINES OR MOTORS.
No. 531,623. Patented Jan. 1, 1895.
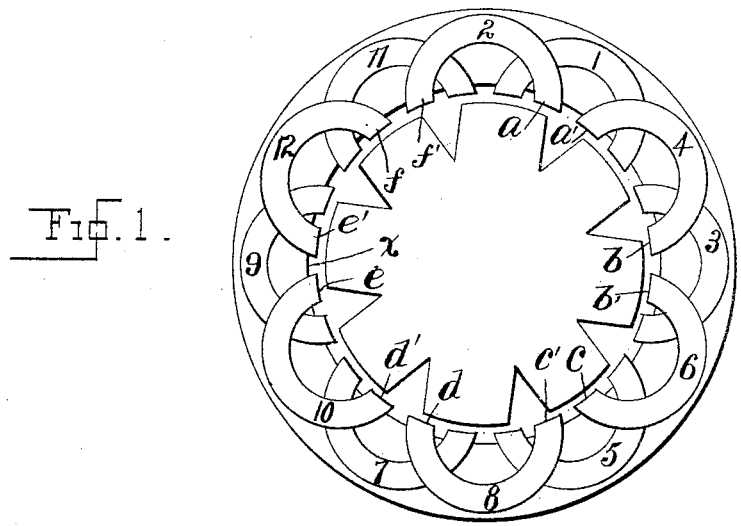
Fig. 1.
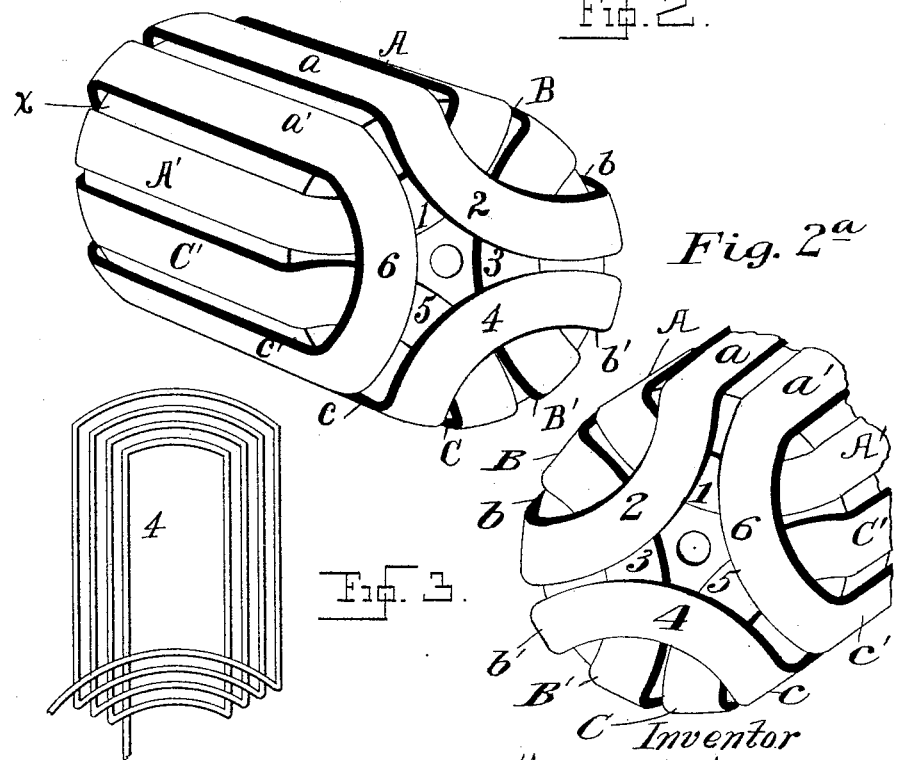
Fig. 2. Fig. 2ª Fig. 3.
Witnesses
Wm. H. Courtland
Leocadia M. Lennan
Inventor
Ward Decker
By his Attorney
Edward P. Thompson

UNITED STATES PATENT OFFICE.

WARD DECKER, OF OWEGO, NEW YORK.

ARMATURE FOR DYNAMO-ELECTRIC MACHINES OR MOTORS.

SPECIFICATION forming part of Letters Patent No. 531,623, dated January 1, 1895.

Application filed November 17, 1892. Serial No. 452,262. (No model.)

*To all whom it may concern:*

Be it known that I, WARD DECKER, a citizen of the United States of America, and a resident of Owego, in the county of Tioga, State of New York, have invented certain new and useful Improvements in Dynamo or Electric Motor Armatures, (Case 4,) of which the following is a specification.

My invention relates to the construction of an armature, and particularly to the relative location of the coils and core.

By my invention the coils may be easily made and quickly applied to the core, and besides this advantage, there are electrical merits which are set forth in my application filed simultaneously with this, Serial No. 452,261, filed November 17, 1892.

The device is explained in detail by reference to the accompanying drawings.

Figure 1 is an elevation of an armature in the form of a ring and having the active portions of the coils on the inner surface. An eight pole field magnet core is shown. Fig. 2 is a perspective view of a simpler form of armature of the drum type built according to my invention, and Fig. 2ª is a similar view showing the other end of the same. The armature in Fig. 1 has twelve coils, and that in Figs. 2 and 2ª six. In each of these figures, the coils are shown in outline or as a whole; i. e., the individual wires are not represented. Fig. 3 is a perspective view of one of the coils in which the conductor may be followed from end to end.

There are two groups of coils. One is made up of the coils 1, 3, 5, &c., and the other of coils 2, 4, 6, &c. The coils with odd numbers, 1, 3, 5, &c., differ from those with even numbers, 2, 4, 6, &c., only in length, the former being the shorter. By their length, is meant the direction of their major axes, which are parallel to the axis or shaft of the core. The short coils 1, 3, 5, &c., are first applied to the core, so that the active portions thereof are on the cylindrical surface of the core and parallel to its axis. The long coils are placed over the short coils in such a manner that their adjacent sides, $a$, $a'$, and $b$, $b'$, and $c$, $c'$, &c., occupy those portions of the cylindrical surface $x$ between the parallel sides, respectively, A, A', and B, B' and C, C', &c., of the short coils. The adjacent sides of the long coils lie respectively in the open spaces between the sides of the short coils. The short coils are of the same electrical and mechanical dimensions, and shape, and the same may be said of the long coils.

In the figures the ends of the coils are shown curved, but this need not be. They could extend from one portion of the armature to the other in directions parallel to chords of the circumference of the core, or they could be curved in any other directions than that shown, provided they have the proper equality of dimensions in the manner stated above.

The coils subtend equal arcs. In Fig. 3 for example, the arc, in the case of each coil, is about one hundred and twenty degrees. Their positions may also be described by stating that in proceeding around the armature one meets first, two sides of different long coils; then two sides of two different short coils; then two sides of two different long coils; then two sides of two different short coils, and so on.

Inasmuch as armature and field magnet are largely correlative terms, it is evident that my invention may be considered as relating to a field magnet as well as to an armature.

I claim as my invention—

In an armature, the combination with a core, of two series of coils each having a rectangular form, but having sides of different lengths, the shorter of said series of coils being arranged upon the core with their longer sides adjacent to one another, at distances less than the width of any side of any coil and the longer of said series of coils being arranged with their longer sides also adjacent to one another at distances less than the width of any side of any coil and between the said longer sides of the short coils, substantially as set forth.

In testimony that I claim the foregoing as my invention I have signed my name, in presence of two witnesses, this 12th day of November, 1892.

WARD DECKER.

Witnesses:
FRED C. HILL,
F. H. EATON.